Feb. 10, 1925.
1,525,747

C. KINSLEY

PLATE CONNECTER FOR BATTERIES

Filed June 18, 1921

Inventor
Carl Kinsley
By Edward E. Clement
Attorney

Patented Feb. 10, 1925.

1,525,747

UNITED STATES PATENT OFFICE.

CARL KINSLEY, OF FALLS CHURCH, VIRGINIA, ASSIGNOR TO ENGINEER'S DEVELOPMENT COMPANY, A GENERAL PARTNERSHIP COMPOSED OF FREDERICK E. PERNOT AND CARL KINSLEY.

PLATE CONNECTER FOR BATTERIES.

Application filed June 18, 1921. Serial No. 478,607.

*To all whom it may concern:*

Be it known that I, CARL KINSLEY, a citizen of the United States, residing at Falls Church, Virginia, have invented certain new and useful Improvements in Plate Connecters for Batteries, of which the following is a specification, reference being had therein to the accompanying drawing.

My invention relates to storage batteries, and has for its object the provision of means to prevent creepage of the electrolyte between adjacent cells.

The present application being for a part of a battery only, reference is hereby made for complete disclosure of the battery to which the part is intended to be applied, to prior application filed September 18, 1920, Serial No. 411,097.

I attain my object by connecting adjacent cell plates through a lead wire closely surrounded by a covering of rubber, the whole surrounded by and embedded in heavy insulating material such as asphalt. The lead connecter is preferably made of considerable length, and the rubber coating or jacket may be moulded thereon, or preferably drawn on in the form of close fitting tubing internally coated with asphaltum and maintaining a compression contact throughout with the wire, due to the elasticity of the rubber, increased if desired by an applied compressor such as wire or tape.

I have found that ordinary insulation such as asphaltum by itself does not prevent a gradual discharge from the electrolyte of one cell to the electrolyte of the adjacent cell, slight discoloration being observable at the plate terminals even where a long connecter is employed and the cell openings are widely spaced apart. There seems to be some creepage between the asphalt and the lead. Where the connection is made through a soldered joint, the validity of the joint become impaired, probably due to the same electrolytic action and creepage, even when embedded tightly in asphaltum or other material. My rubber covering, however, when applied on both sides of such a joint acts like a dam, and apparently completely protects the cells, the connecter, and the joint.

My invention is illustrated in the accompanying drawings, in which—

Figure 1:
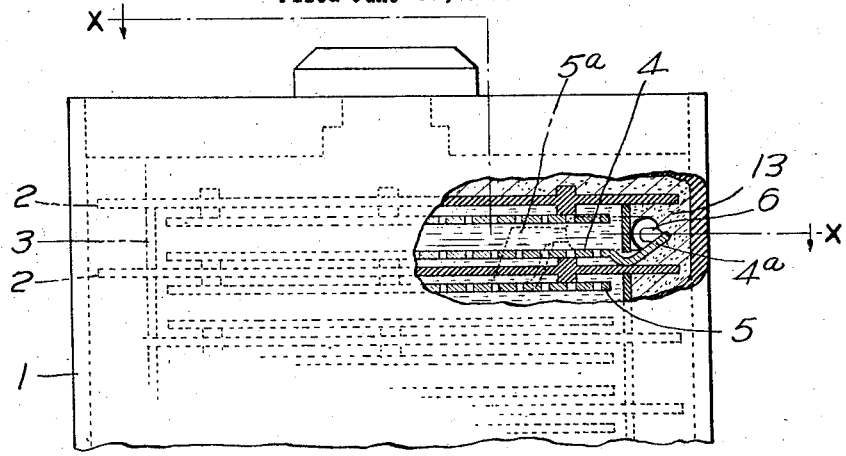
Fig. 1 is a longitudinal section of one end of a battery showing two cells, and my improved connecter.
Figure 2:
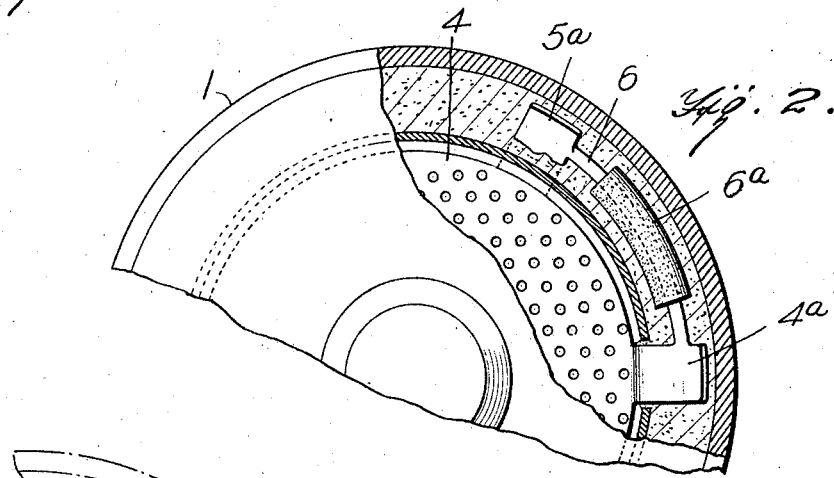
Fig. 2 is a transverse section on the line $x$—$x$ of Fig. 1, showing in full lines one plate, the connecter, a diaphragm, and in dotted lines the connection to a plate in the adjacent cell.

Referring to Figs. 1 and 2, 1 is the battery casing, containing hard rubber diaphragms 2, hard rubber rings 3, plates 4, 5, etc., and a suitable electrolyte not shown. Plate 4 is connected to plate 5 through a lead wire 6, carrying a rubber tube $6^a$ hugging it closely and preferably internally coated with asphaltum. The plates 4 and 5 have terminal extensions $4^a$ and $5^a$ which emerge from their respective cells through notches or slots in the rings 3, and the connecter wire 6 passes from one terminal $4^a$ through the circumferential space around the cell containing that terminal, to the other terminal, $5^a$, (which is staggered as described in my aforesaid application) and passes through a notch in diaphragm 2 and so to the plate 5 in the adjacent cell. After assembly, these spaces and all interstitial spaces around and between the diaphragms, rings and connecters, are filled with asphaltum, as described in my prior application.

Figure 3:
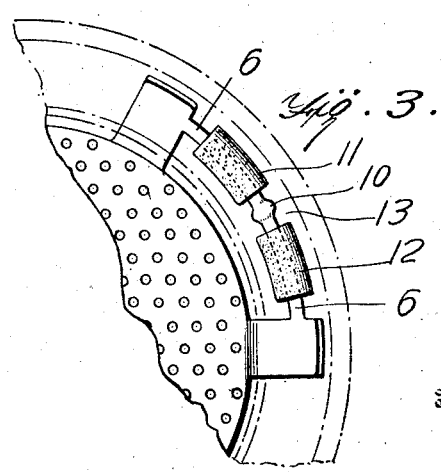
Fig. 3 shows diagrammatically a connecter having a soldered joint with rubber tubes on both sides of the joint.
Figure 4:
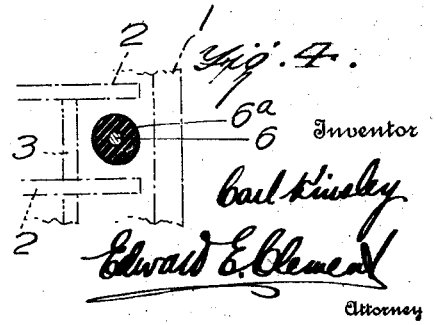
Fig. 4 is a detail section of the connecter parts.

Referring to Fig. 3, 6 designates the plate connecter, which may be composed of terminal extensions from the plates or separate lead pieces burned or soldered thereto, but in any case having a joint 10, on both sides of which I place rubber tubing or coatings 11 and 12, applied as before and all embeded in asphaltum 13. Such a protected joint is free from attack and consequent deterioration.

It is to be noted that this invention, while described as applied to storage battery connecters only, is applicable wherever similar conditions exist between bodies having a difference of potential, with possible electrolytic action due thereto. I wish my claims to be construed accordingly.

What I claim is:

1. A connecter for electrical bodies exposed to a difference of potential, comprising a metal conductor, an insulator, and a dam between the conductor and the insulator acting to prevent creepage or interstitial electrolytic action.

2. A connecter for electrical bodies exposed to a difference of potential, comprising a metal conductor an insulator and an elastic dam surrounding the conductor and enclosed between the conductor and the insulator and by virtue of the mechanical pressure it exerts on said conductor acting to prevent creepage or interstitial electrolytic action.

3. A connecter for storage battery cells comprising terminal conductors connected to adjacent plates, a joint connecting said conductors, resilient insulating tubes tightly embracing said conductors, one portion on each side of the joint, and a solid impervious insulator surrounding and embedding the whole.

In testimony whereof I affix my signature.

CARL KINSLEY.